(12) United States Patent
Zhan et al.

(10) Patent No.: US 8,303,925 B2
(45) Date of Patent: Nov. 6, 2012

(54) MANUFACTURE METHOD OF ULTRA-PURE SULFURIC ACID

(75) Inventors: Jiarong Zhan, Shanghai (CN); Curtis Dove, Shanghai (CN); I-Hsing Lin, Shanghai (CN)

(73) Assignee: Asian Union Electronic Chemical Corp. Shanghai, Shanghai (CN)

( * ) Notice: Subject to any disclaimer, the term of this patent is extended or adjusted under 35 U.S.C. 154(b) by 51 days.

(21) Appl. No.: 12/915,902

(22) Filed: Oct. 29, 2010

(65) Prior Publication Data

US 2011/0318260 A1    Dec. 29, 2011

(30) Foreign Application Priority Data

Jun. 29, 2010    (CN) .......................... 2010 1 0214321

(51) Int. Cl.
*C01B 17/74* (2006.01)

(52) U.S. Cl. ...................................... 423/522; 423/529

(58) Field of Classification Search .................. 423/522, 423/529

See application file for complete search history.

(56) References Cited

U.S. PATENT DOCUMENTS

2011/0318260 A1*  12/2011  Zhan et al. ..................... 423/529

FOREIGN PATENT DOCUMENTS

CN    100335405 C    9/2007

\* cited by examiner

*Primary Examiner* — Timothy Vanoy
(74) *Attorney, Agent, or Firm* — Duane Morris LLP; J. Rodman Steele, Jr.; Gregory M. Lefkowitz

(57) ABSTRACT

A method of manufacturing ultra-pure sulfuric acid is described. Industrial sulfur trioxide is used as the raw material, gasifying it in a round gasifier, getting it gasified for the second time after condensation, sulfur trioxide gas has been purified. Absorbing the sulfur trioxide gas with the dilute sulfuric acid circularly, collect the target product of ultra-pure sulfuric acid. The main content of the ultra-pure sulfuric acid obtained by the method of the present invention can reach more than 96 wt %, the content of the impurities of metal ions, is in conformity with the SEMI C12 standard.

4 Claims, 1 Drawing Sheet

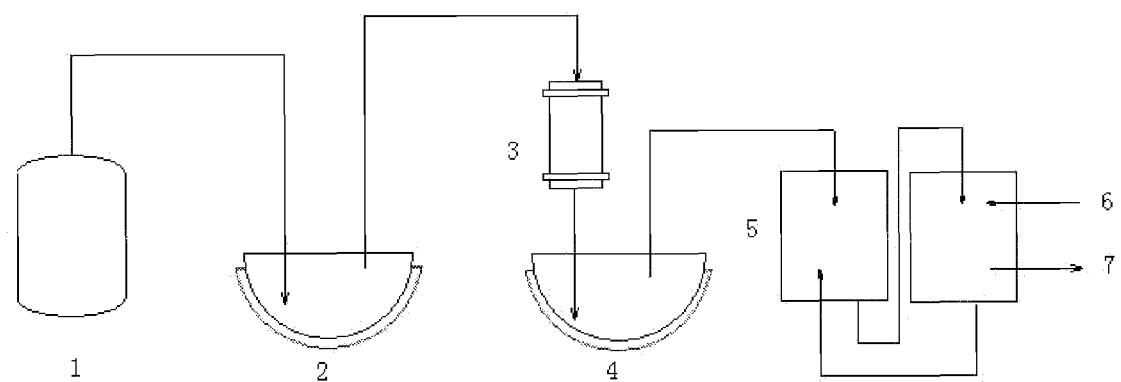

MANUFACTURE METHOD OF ULTRA-PURE SULFURIC ACID

CROSS REFERENCE TO RELATED APPLICATIONS

This application claims priority to China Patent Application No. 201010214321.3 entitled A MANUFACTURE METHOD OF ULTRA-PURE SULFURIC ACID, filed Jun. 29, 2010 the disclosure of which is incorporated herein by reference in its entirety.

BACKGROUND OF THE INVENTION

1. Field of the Invention

The invention relates to a method of manufacturing ultra-pure sulfuric acid, specifically relates to a continuous manufacture method of ultra-pure sulfuric acid which is in conformity with SEMI C12 standard for cleaning and etching the wafer during the manufacturing process of semiconductor component.

2. Description of the Related Art

Ultra-pure sulfuric acid, also known as electronic grade sulfuric acid, is a very important kind of microelectronics chemical reagents. With the rapid development of electronic industry, the consumption of ultra-pure sulfuric acid in the semiconductor industry accounted for about 30% of total ultra-pure reagents. It's widely used in semiconductors, ultra-large scale integrated circuit assembly and processing. The purity of ultra-pure sulfuric acid has a significant impact on the yield of cleaning, etching products, electrical performance and reliability, for example the ultra-pure sulfuric acid can effectively remove the impurity particles, inorganic residue and carbon deposits on the wafer while cleaning, etching. Generally, the purity of ultra-pure sulfuric acid is required to meet to the chemical materials level 12, SEMI C12 standard formulated by Semiconductor Equipment and Materials International (referred to as SEMI C12 standard), the mass fraction of metal impurity level should be less than 0.1 ppb ($1\times10^{-10}$ to $1\times10^{-11}$).

Among the existing technology, the traditional method is to direct distill the industrial sulfuric acid to remove impurities with high boiling point to obtain sulfuric acid with high purity. The product manufactured by this method contains impurities which is hard to be removed by distillation, the content of impurities is not conformity with SEMI C12 standard, since the boiling point of the sulfuric acid reaches a high temperature 330° C., therefore the energy consumption during the distillation and the cost are high, the waste gas and the acid mist generated during the distillation will cause damage on the human, there is no good for environment protection.

China Patent No. 200510018925.X provides a method for producing analytically pure sulfuric acid, which use the sulfur trioxide gas as raw material, make the sulfur trioxide react with the water to get analytically pure sulfuric acid. Although this method reduces the energy consumption, the content of impurities level of the product is too high to be in conformity with the requirements of SEMI C12 standard.

Currently, there is no report on the manufacture method of the ultra-pure sulfuric acid which is in conformity with SEMI C12 standard in domestic range.

SUMMARY OF THE INVENTION

The technical problem needs to be solved by this invention is to provide a manufacture method of ultra-pure sulfuric acid to overcome the shortage of the traditional method, such as easy to cause pollution, high energy consumption, high cost and so on, and the high impurity level which manufactured by existing method with sulfur trioxide as raw material.

The technical programs of the invention are as follows:

A manufacture method of ultra-pure sulfuric acid, use industrial sulfur trioxide as the raw material, gasify it in a round gasifier, get it gasified for the second time after condensation, sulfur trioxide gas has been purified, absorb the sulfur trioxide gas with the dilute sulfuric acid of different concentration circularly, collect the target product of ultra-pure sulfuric acid at last which is in conform with SEMI C12 standard.

The specific manufacture method includes the following steps:

(1) Ventilate the industrial sulfur trioxide as feedliquor of 5-20° C. into the round gasifier under the condition of 0.1-0.15 Mpa, gasify at the superficial velocity of 2-5 m³/hour under the condition of 40-55° C., condense the obtained gas into liquid by cooling tower, ventilate it into the round gasifier under the same conditions for the secondary gasification, and obtain the purified sulfur trioxide gas.

(2) Use the dilute sulfur acid, which the mass percentage concentration is 10-50% to absorb the purified sulfur trioxide gas obtained in the step (1) in the circle absorber.

The temperature of the circular absorption of dilute sulfuric acid is 0-10° C.

While collecting of the target product ultra-pure sulfuric acid, supply the dilute sulfuric acid through the inlet during the circle absorption, and delivering the product into the finished product container after determining that the main content of the product is qualified.

Using purified water to absorb the purified sulfur trioxide gas to obtain the dilute sulfuric acid, then obtain the dilute sulfuric acid of different concentrations by determining the main content of the product.

The ultra-pure sulfuric acid obtained with the present invention, the main content can reach 96-97 wt %, after analyzed and detected with ICP-MS, the content of metal ion impurities are lower than 0.1 ppb, dust particles larger than 0.5 μm are lower than 5 pieces/mL, consistent with SEMI C12 standard.

In this invention, the inside of the containers, pipes which contact the dilute sulfuric acid, ultra-pure sulfuric acid coated with fluorine-containing materials for protection.

Comparing with the existing technology, this invention has the following advantages:

Secondary gasification is applied in the present invention, improves the purity of the sulfuric acid effectively, solves problem of the high content of the impurities of metal ions in the sulfuric acid product which manufactured with existing technology. Furthermore, by using dilute sulfuric acid with different concentration to absorb the purified sulfur trioxide circularly, cuts the cost of production and easy to operate, avoids the shortage of traditional production methods, such as easy to cause pollution, high energy consumption, high cost. In this invention, there is no concentration limit for dilute sulfuric acid which is used to circular absorption, supplied through the inlet during the circle absorption, the main content of products in the circular absorption solution can be determined in real time. It overcome the shortcoming, the unstable quality of the product which produced in the traditional production methods, it is suitable for large-scale continuous production.

BRIEF DESCRIPTION OF THE DRAWINGS

FIG. 1 is the producing flow chart of the invention.

Pt 1 is the feed tank, Pt 2 is the round gasifier, Pt 3 is the cooling tower, Pt 4 is the secondary round gasifier, Pt 5 is the circle absorber, Pt 6 is the inlet of the dilute sulfuric acid, Pt 7 is the outlet and test port.

DETAILED DESCRIPTION OF CERTAIN ILLUSTRATIVE EMBODIMENTS

The present invention will be further described by the following embodiments, but the protection scope of the present invention will not be limited by the following embodiments.

Embodiment 1

(1) Ventilating the industrial sulfur trioxide feedliquor of 5° C. into the round gasifier under the condition of 0.15 Mpa, gasifying at the superficial velocity of 2 m$^3$/hour, at 45±2° C., ventilating the obtained gas into the cooling tower, condensing the gas by cooling tower at 0-10° C., ventilating the condensate into the secondary round gasifier for the secondary gasification, and keep the temperature below 50° C.

(2) Infunding the purified sulfur trioxide gas, which obtained by secondary gasified, into the circle absorber, controlling the temperature of the circle absorber at 0-10° C. with brine ice, then using the dilute sulfur acid, which the mass percentage concentration is 10% to absorb the sulfur trioxide gas circularly and obtaining the ultra-pure sulfuric acid, infunding it into the finished product container after determining that the main content of the product is qualified, in addition, supply the dilute sulfuric acid which below 10° C. during the circle absorption to continuous production.

Test results: the main content of ultra-pure sulfuric acid is 96.76 wt %, single cation content is less than 0.1 ppb, single anion content is less than 0.1 ppm, the dust particles larger than 0.5 μm is 2.8 pieces/mL. (Refer to Table 1)

Embodiment 2

(1) Ventilating the industrial sulfur trioxide feedliquor of 10° C. into the round gasifier under the condition of 0.12 Mpa, gasifying at the superficial velocity of 4 m$^3$/hour, at 50±2° C., ventilating the obtained gas into the cooling tower, condensing the gas by cooling tower at 0-10° C., ventilating the condensate into the secondary round gasifier for the secondary gasification, and keep the temperature below 55° C.

(2) Infunding the purified sulfur trioxide gas, which obtained by secondary gasified, into the circle absorber, controlling the temperature of the circle absorber at 0-10° C. with brine ice, then using the dilute sulfur acid, which the mass percentage concentration is 30% to absorb the sulfur trioxide gas circularly and obtaining the ultra-pure sulfuric acid, infunding it into the finished product container after determining that the main content of the product is qualified, in addition, supply the dilute sulfuric acid which below 10° C. during the circle absorption to continuous production.

Test results: the main content of ultra-pure sulfuric acid is 96.51 wt %, single cation content is less than 0.1 ppb, single anion content is less than 0.1 ppm, the dust particles larger than 0.5 μm is 2.6 pieces/mL. (Refer to Table 1)

Embodiment 3

(1) Ventilating the industrial sulfur trioxide feedliquor of 20° C. into the round gasifier under the condition of 0.1 Mpa, gasifying at the superficial velocity of 5 m$^3$/hour, at 55° C., ventilating the obtained gas into the cooling tower, condensing the gas by cooling tower at 0-10° C., ventilating the condensate into the secondary round gasifier for the secondary gasification, and keep the temperature below 55° C.

(2) Infunding the purified sulfur trioxide gas, which obtained by secondary gasified, into the circle absorber, controlling the temperature of the circle absorber at 0-10° C. with brine ice, then using the dilute sulfur acid, which the mass percentage concentration is 50% to absorb the sulfur trioxide gas circularly and obtaining the ultra-pure sulfuric acid, infunding it into the finished product container after determining that the main content of the product is qualified, in addition, supply the dilute sulfuric acid which below 10° C. during the circle absorption to continuous production.

Test results: the main content of ultra-pure sulfuric acid is 96.50 wt %, single cation content is less than 0.1 ppb, single anion content is less than 0.1 ppm, the dust particles larger than 0.5 μm is 3.5 pieces/mL. (Refer to Table 1)

TABLE 1

The standards and analysis results of ultra-pure sulfuric acid

| Items | SEMI C8 | SEMI C12 | Embodiment 1 | Embodiment 2 | Embodiment 3 | Analytical Instruments |
|---|---|---|---|---|---|---|
| Content ($H_2SO_4$) | 96-97% | 96-97% | 96.76% | 96.51% | 96.50% | Automatic Titrator |
| Appearance (APHA) | 10 | 5 | <5 | <5 | <5 | Chemical Analysis |
| Evaporation residue (ppm) | 1 | 1 | <1 | <1 | <1 | Chemical Analysis |
| $Cl^-$ ppm | 0.05 | 0.05 | <0.05 | <0.05 | <0.05 | Nephelometer |
| $NO_3^-$ ppm | 0.1 | 0.1 | <0.1 | <0.1 | <0.1 | UV |
| $PO_4^-$ ppm | 0.1 | 0.1 | <0.1 | <0.1 | <0.1 | Spectrophotometer |
| Al ppb | 1 | 0.3 | 0.005 | 0.004 | 0.010 | ICP-MS |
| Sb ppb | 1 | 0.1 | 0.022 | 0.027 | 0.018 | ICP-MS |
| As ppb | 1 | 0.1 | 0.044 | 0.025 | 0.032 | ICP-MS |
| Ba ppb | 1 | 0.1 | 0.005 | 0.004 | 0.003 | ICP-MS |
| Be ppb | 1 | 0.1 | <0.001 | <0.001 | <0.001 | ICP-MS |
| Bi ppb | 1 | 0.1 | 0.003 | 0.001 | 0.002 | ICP-MS |
| B ppb | 1 | 0.1 | <0.001 | <0.001 | <0.001 | ICP-MS |
| Cd ppb | 1 | 0.1 | 0.036 | 0.033 | 0.046 | ICP-MS |
| Ca ppb | 1 | 0.5 | 0.160 | 0.111 | 0.203 | ICP-MS |
| Cr ppb | 1 | 0.1 | 0.022 | 0.011 | 0.012 | ICP-MS |
| Co ppb | 1 | 0.1 | <0.001 | 0.001 | 0.001 | ICP-MS |
| Cu ppb | 1 | 0.1 | 0.009 | 0.005 | 0.008 | ICP-MS |
| Ga ppb | 1 | 0.1 | 0.043 | 0.053 | 0.061 | ICP-MS |
| Ge ppb | 1 | 0.1 | 0.037 | 0.016 | 0.016 | ICP-MS |

TABLE 1-continued

The standards and analysis results of ultra-pure sulfuric acid

| Items | SEMI C8 | SEMI C12 | Embodiment 1 | Embodiment 2 | Embodiment 3 | Analytical Instruments |
|---|---|---|---|---|---|---|
| Au ppb | 1 | 0.1 | 0.018 | 0.009 | 0.023 | ICP-MS |
| Fe ppb | 1 | 0.1 | 0.056 | 0.048 | 0.079 | ICP-MS |
| Pb ppb | 1 | 0.1 | <0.001 | <0.001 | <0.001 | ICP-MS |
| Li ppb | 1 | 0.1 | <0.001 | <0.001 | <0.001 | ICP-MS |
| Mg ppb | 1 | 0.1 | 0.006 | 0.003 | 0.009 | ICP-MS |
| Mn ppb | 1 | 0.1 | 0.007 | 0.005 | 0.002 | ICP-MS |
| Mo ppb | 1 | 0.1 | 0.014 | 0.018 | 0.023 | ICP-MS |
| Ni ppb | 1 | 0.1 | 0.018 | 0.015 | 0.012 | ICP-MS |
| Nb ppb | 1 | 0.1 | 0.004 | 0.003 | 0.004 | ICP-MS |
| K ppb | 1 | 0.3 | 0.104 | 0.095 | 0.098 | ICP-MS |
| Ag ppb | 1 | 0.1 | 0.076 | 0.062 | 0.073 | ICP-MS |
| Na ppb | 1 | 0.5 | 0.005 | 0.0028 | 0.0019 | ICP-MS |
| Sr ppb | 1 | 0.1 | 0.004 | 0.004 | 0.003 | ICP-MS |
| Ta ppb | 1 | 0.1 | 0.017 | 0.015 | 0.011 | ICP-MS |
| Tl ppb | 1 | 0.1 | 0.002 | 0.003 | 0.002 | ICP-MS |
| Sn ppb | 1 | 0.1 | 0.010 | 0.009 | 0.013 | ICP-MS |
| Ti ppb | 1 | 0.1 | <0.001 | <0.001 | <0.001 | ICP-MS |
| V ppb | 1 | 0.1 | <0.001 | <0.001 | <0.001 | ICP-MS |
| Zn ppb | 1 | 0.1 | 0.050 | 0.053 | 0.091 | ICP-MS |
| Zr ppb | 1 | 0.1 | 0.007 | 0.006 | 0.009 | ICP-MS |
| Dust particles pieces/ml | | | | | | |
| >0.2 μm | 200 | 100 | 55.8 | 53.6 | 63.5 | Particle Detector |
| >0.3 μm | 50 | 20 | 8.9 | 7.6 | 10.2 | |
| >0.5 μm | 10 | 5 | 2.8 | 2.6 | 3.5 | |

The automatic titrator is used to analyze the content of ultra-pure sulfuric acid, the ICP-MS is used to analyze the cation, the nephelometer and the UV spectrophotometer is used to analyze the anion, the laser particle counter is used to determine the dust particles. (Specific machine model shown in Table 2)

TABLE 2

The name and model of the testing equipments

| Name | Technical Requirements | Model |
|---|---|---|
| Automatic Titrator | <0.01% | Mettler DL50 |
| Inductively Coupled Plasma Mass Spectrometer(ICP-MS) | Test limits <1 ppt | Agilent ICP-MS-7500S |
| Nephelometer | Test limits <0.1 ppb | 2100N HACH |
| UV spectrophotometer | Anions <20 ppb | Thermal Alpha UV-Vis |
| Laser scattering particle analyzer | Test <0.1μ Granule | Rion 40AF |

Lastly, it should be explained that these cases merely to illustrate the implementation of the technical program of this invention rather than limiting. Although the reference of the present invention is described in detail with a better implementation of regulations regarding, general skilled in the art should understand that the technical program of the invention can be modified, or equivalent replaced, if the technical program does not digress from this invention range, it should be considered into the range of the invention claims.

What is claimed is:

1. A method of manufacturing ultra-pure sulfuric acid, comprising:
   (1) ventilating the industrial sulfur trioxide as feedliquor of 5-20° C. into the round gasifier under the condition of 0.1-0.15 Mpa, gasifying at the superficial velocity of 2-5 m$^3$/hour under the condition of 40-55° C., condensing the obtained gas into liquid by cooling tower, ventilating it into the round gasifier under the same conditions for the secondary gasification, then obtain the purified sulfur trioxide gas;
   (2) using the dilute sulfur acid, which the mass percentage concentration is 10-50% to absorb the sulfur trioxide gas obtained in the step (1) in the circle absorber.

2. The method as claimed in claim 1, wherein the temperature of the circular absorption of dilute sulfuric acid is 0-10° C.

3. The method as claimed in claim 1, wherein the collection of the target product ultra-pure sulfuric acid includes the following steps:
   supplying the dilute sulfuric acid through the inlet during the circle absorption, and delivering the product into the finished product container after determining that the main content of the product is qualified.

4. The method as claimed in claim 1, wherein internal wall of containers and pipes which contact with the dilute sulfuric acid or the ultra-pure sulfuric acid are coated with fluorine-containing materials for protection.

* * * * *